B. F. OLSEN.
TEA OR COFFEE POT.
APPLICATION FILED JULY 22, 1920.
1,397,978.
Patented Nov. 22, 1921.
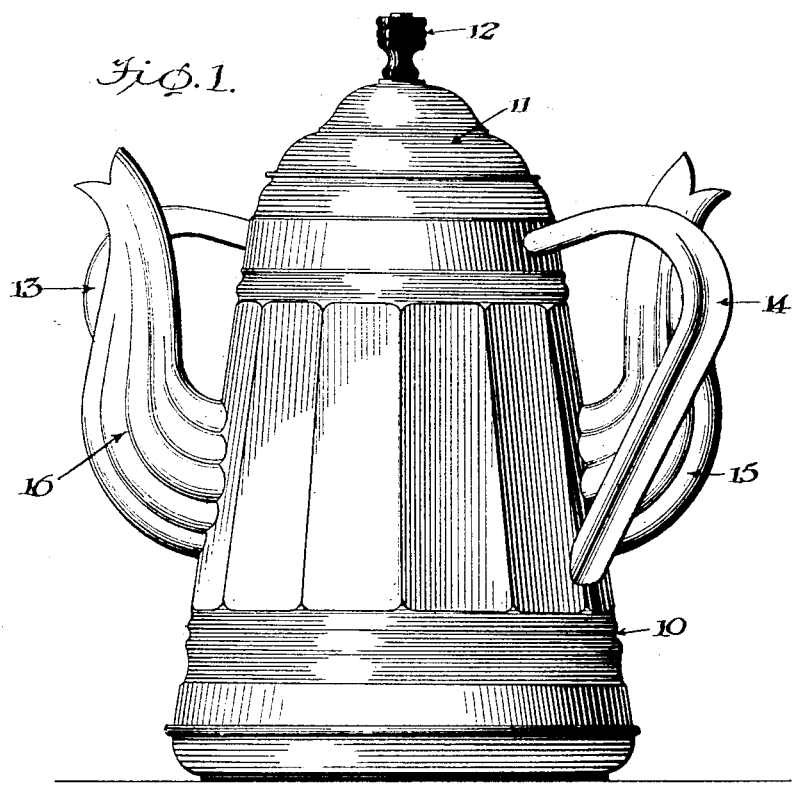
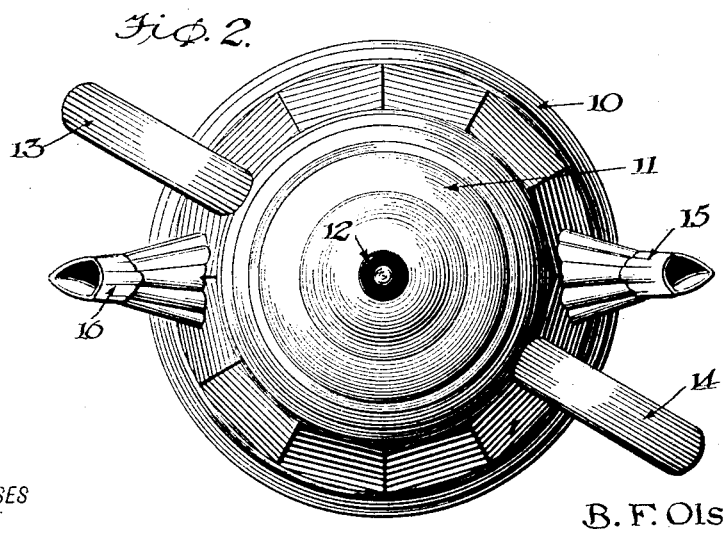
WITNESSES
INVENTOR
B. F. Olsen,
BY
ATTORNEYS

UNITED STATES PATENT OFFICE.

BEN FRED OLSEN, OF MARCUS, WASHINGTON.

TEA OR COFFEE POT.

1,397,978.  Specification of Letters Patent.  Patented Nov. 22, 1921.

Application filed July 22, 1920. Serial No. 398,061.

*To all whom it may concern:*

Be it known that I, BEN FRED OLSEN, a citizen of the United States, and a resident of Marcus, in the county of Stevens and State of Washington, have invented certain new and useful Improvements in Tea or Coffee Pots, of which the following is a specification.

This invention relates to tea or coffee pots and the like, and the object thereof is to provide an improved construction adapted for table use to facilitate passing the pot or other container from one person to another.

The invention comprehends a coffee or tea pot or the like, which is provided with a novel arrangement of spouts and handles so that the same may be passed from one person to another without setting the device down and the person passing the same can maintain a hold until the person receiving the same has tightly grasped it.

Other and further objects of my invention will become readily apparent to persons skilled in the art, from a consideration of the following description when taken in conjunction with the accompanying drawings, wherein:

Figure 1 is a side elevation of a tea or coffee pot in accordance with the invention, and Fig. 2 is a plan view thereof.

Referring to the drawings in detail, in which like reference characters designate corresponding parts throughout the several views, the body of the coffee pot is designated at 10, being preferably of that style which is frusto-conical in outline, being enlarged toward the base or tapered toward the top and being of circular cross section. The top portion is provided with a lid or cover 11, which is preferably provided with a finger-hold 12 by which the same may be applied or removed.

In lieu of providing a single spout and a single handle disposed diametrically opposite to each other, which requires the coffee or tea pot to be set down in order to pass the same from one person to another in use, as ordinarily constructed, the tea or coffee pot in accordance with the present invention is provided with diametrically opposed handles 13 and 14 arranged at the periphery or side of the body and so constructed as to facilitate handling. These handles may be of metal or other material suitably insulated from the body, in order to prevent the transference of heat, and as shown, the handles have their lower portions extending upwardly and outwardly and have their upper portions turned inwardly substantially at right angles, the ends thereof being anchored to the body.

The spouts are designated at 15 and 16, being of the usual or any preferred type adapted for use in connection with tea or coffee pots or the like and leading from any suitable point at the interior of the body best suited for the purpose for which the device is to be used. These spouts are also located diametrically opposite, and in juxtaposition to the handles 13 and 14, being located upon common sides thereof, that is, in a direction nearest thereto in an anti-clockwise direction, with an angle of less than 180 degrees between corresponding handles and spouts which are used together. Thus, it will appear that if a person is holding the device by the handle 13, the spout 15 will be used as a pouring spout and when the device is held by the handle 14, the spout 16 will be used. On the other hand, if a person is holding the device by one of the handles, he may readily pass the same to another person with convenience and without setting the device down or gripping hold of the spout, the person receiving the device catching hold of the other or the diametrically related handle. It will then be unnecessary to change the position of the device in the hand, the corresponding spout being used to pour the contents. It is also to be understood that the material and shape of the pot may be varied as desired, as well as the relative location of the handles and spouts, though I have illustrated the preferred embodiment.

In view of the foregoing, it is thought that the operation of the device will be readily understood and in view of the simplicity and practical value that it will commend itself to those skilled in the art.

Having thus described my invention, what I claim is:—

A tea or coffee pot comprising a receptacle body having a cover, a pair of diametrically opposed handles on the body and a corresponding pair of diametrically opposed spouts leading from the interior of the body upwardly and outwardly and disposed in juxta-position to the handles and in horizontal alinement therewith, corresponding handles and spouts being arranged at an angle of substantially 150° from each other.

BEN FRED OLSEN.